(12) United States Patent
Phillippe

(10) Patent No.: US 12,096,234 B2
(45) Date of Patent: Sep. 17, 2024

(54) TECHNIQUES FOR OPTIMIZING WIRELESS DEPLOYMENTS USING LOCATION-BASED ASSOCIATION AFFINITY

(71) Applicant: Oracle International Corporation, Redwood Shores, CA (US)

(72) Inventor: Bryan James Phillippe, Fall City, WA (US)

(73) Assignee: Oracle International Corporation, Redwood Shores, CA (US)

( * ) Notice: Subject to any disclaimer, the term of this patent is extended or adjusted under 35 U.S.C. 154(b) by 67 days.

(21) Appl. No.: 17/350,222

(22) Filed: Jun. 17, 2021

(65) Prior Publication Data

US 2022/0408271 A1 Dec. 22, 2022

(51) Int. Cl.
*H04W 16/18* (2009.01)
*H04B 17/318* (2015.01)
*H04W 24/08* (2009.01)
*H04W 88/08* (2009.01)

(52) U.S. Cl.
CPC .......... *H04W 16/18* (2013.01); *H04B 17/318* (2015.01); *H04W 24/08* (2013.01); *H04W 88/08* (2013.01)

(58) Field of Classification Search
CPC ..... H04W 16/18; H04W 24/08; H04W 88/08; H04W 48/20; H04W 84/12; H04B 17/318
See application file for complete search history.

(56) References Cited

U.S. PATENT DOCUMENTS

| | | | |
|---|---|---|---|
| 9,307,432 B2 * | 4/2016 | Gao | H04W 64/00 |
| 9,894,604 B1 * | 2/2018 | Tran | H04W 48/20 |
| 10,200,887 B2 * | 2/2019 | Thanayankizil | H04W 40/246 |
| 2015/0296450 A1 * | 10/2015 | Koo | H04W 48/16 455/435.3 |
| 2015/0319318 A1 * | 11/2015 | Hashimoto | H04N 1/00795 358/476 |
| 2015/0358980 A1 * | 12/2015 | Hara | H04L 43/16 370/329 |

(Continued)

FOREIGN PATENT DOCUMENTS

| | | | | |
|---|---|---|---|---|
| CN | 107509223 A | * | 12/2017 | H04W 36/0083 |
| WO | WO-2020096066 A1 | * | 5/2020 | H04W 76/10 |

*Primary Examiner* — Mansour Oveissi
(74) *Attorney, Agent, or Firm* — Invoke

(57) ABSTRACT

The present embodiments relate to connecting a network device to a wireless access point in a network environment based on an association affinity between the network device and the wireless access device. A wireless access point in a network environment can receive a request for a first network device to connect to any wireless access point in the network environment that includes a signal strength metric. The wireless access point can determine whether the first network device corresponds with a prioritized wireless access point using weighted averages based on a historical derived proximity of the wireless access points in the network environment and a historical connectivity to wireless access points in the network environment. A connection prioritization action can be performed to connect the first network device with the prioritized wireless access point in the network environment based on the determination of whether the first network device corresponds with the prioritized wireless access point.

26 Claims, 10 Drawing Sheets

(56) References Cited

U.S. PATENT DOCUMENTS

| | | | | |
|---|---|---|---|---|
| 2020/0351739 | A1* | 11/2020 | Vaidya | H04W 36/36 |
| 2021/0405940 | A1* | 12/2021 | Tsuchiya | G06F 3/1292 |
| 2022/0053361 | A1* | 2/2022 | Thubert | H04W 28/0236 |
| 2022/0167300 | A1* | 5/2022 | Anderson | H04W 8/18 |
| 2022/0322224 | A1* | 10/2022 | Jayaraman | H04W 24/10 |

* cited by examiner

TECHNIQUES FOR OPTIMIZING WIRELESS DEPLOYMENTS USING LOCATION-BASED ASSOCIATION AFFINITY

BACKGROUND

Many network environments can include multiple wireless access points that can facilitate wireless data communication with network devices in the network environment. For example, a network device (e.g., a computer, a mobile device, a wireless printer, a network camera, a sensor) can connect to an access point in the network environment to initialize data communication with external devices via an external network (e.g., the internet). In network environments that include multiple wireless access points, the wireless network device may connect to any wireless access point in the network, such as the first wireless access point identified by the wireless network device, for example.

However, in such instances, the wireless network device may not connect to an access point with the greatest network processing efficiency for the wireless network device. For example, a network device may connect to a first access point with a greater distance (and a lower data communication capability) from the network device than a second access point that may include a greater data communication capability for the network device. This can lead to lower data throughput in data communication and lower user experience.

SUMMARY

The present embodiments relate to connecting a network device to a wireless access point in a network environment based on an association affinity between the network device and the wireless access device. A first example embodiment provides a method performed by a first wireless access point in a network environment. The method can include receiving a request for a first network device to connect to any wireless access point in the network environment. The method can also include obtaining a signal strength metric from the first network device.

The method can also include determining whether the first network device corresponds with a prioritized wireless access point. Determining whether the first network device corresponds with the prioritized wireless access point can include processing the historical derived proximity of the wireless access points in the network environment to assign a first set of weighting values to each wireless access point based on a historical proximity of each wireless access device to the first wireless device. Determining whether the first network device corresponds with the prioritized wireless access point can also include processing the historical connectivity to wireless access points in the network environment to assign a second set of weighting values to each wireless access point based on a number of previous connection instances of each wireless access device to the first network device. Determining whether the first network device corresponds with a prioritized wireless access point can also include selecting a second wireless access point as the prioritized wireless access point based on the first set of weighting values and the second set of weighting values assigned to the wireless access points. The method can also include performing a connection prioritization action to connect the first network device with the prioritized wireless access point in the network environment based on the determination of whether the first network device corresponds with the prioritized wireless access point.

A second example embodiment relates to a system. The system can include a processor and a non-transitory computer-readable medium. The non-transitory computer-readable medium can include instructions that, when executed by the processor, cause the processor to receive a request for a first network device to connect to any wireless access point in the network environment. The instructions can further cause the processor to obtain a signal strength metric for the first network device and each wireless access point in the network environment.

The instructions can further cause the processor to determine whether the first network device is associated with any wireless access point in the network environment based at least in part on a historical connectivity to wireless access points in the network environment and the obtained signal strength metrics. The instructions can further cause the processor to perform a connection action to connect the first network device with the prioritized wireless access point in the network environment based on the determination of whether the first network device is associated with any wireless access point in the network environment.

A third example embodiment relates to a non-transitory computer-readable medium. The non-transitory computer-readable medium can include stored thereon a sequence of instructions which, when executed by a processor causes the processor to execute a process. The process can include receiving a request for a first network device to any wireless access point in the network environment. The process can also include obtaining a signal strength metric from the first network device.

The process can also include determining whether the first network device is associated with any wireless access point in the network environment as a prioritized wireless access point. The prioritized wireless access point can be based at least in part on a historical connectivity to wireless access points in the network environment and a historical derived proximity of the wireless access points in the network environment to the first network device derived from obtained signal strength metrics. The process can also include performing a connection prioritization action to connect the first network device with the prioritized wireless access point in the network environment based on the determination of whether the first network device is associated with any wireless access point in the network environment as the prioritized wireless access point.

DETAILED DESCRIPTION

Figure 1:
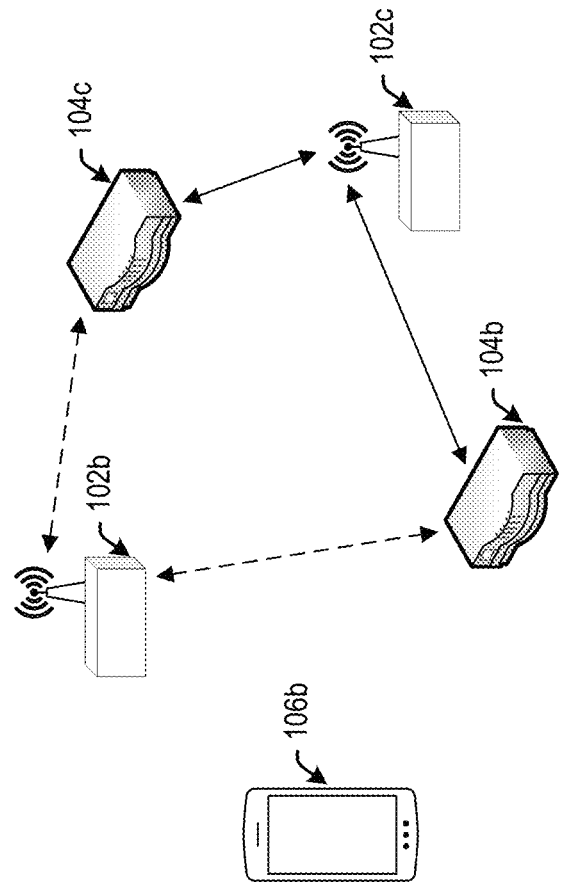
FIG. 1 illustrates an example network environment including multiple access points and multiple network devices, according to at least one embodiment.
Figure 1:
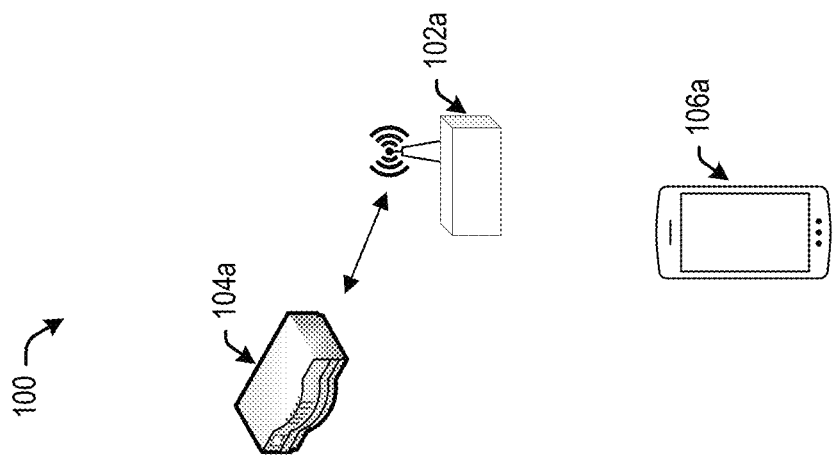

The present embodiments relate to connecting wireless network devices to access points in a network environment based on an affinity between a wireless network device and an access point. An affinity can comprise a previous connections between the wireless network device and the access point based on any of historical connection instances of the wireless network device to the access point and a proximity (e.g., determined based on a signal strength metric) between the wireless network device and the access point. For instance, a wireless network device comprising a wireless printer can be located nearest to a first access point. In this example, the wireless printer can have an affinity to the first access point based on the proximity to the first access point and/or any previous connection instances to the first access point.

Responsive to receiving a request for connection by a wireless network device, a wireless access point can obtain a signal strength metric (e.g., received signal strength indicator (RSSI)) between the wireless network device and each access point. The signal strength metric can provide insights into a proximity to each access point and/or a data processing capability for each access point.

The wireless access point can determine whether the network device is associated with (or has an affinity with) any wireless access point in the network environment. A wireless access point with such an association to the network device (e.g., based on a proximity to the network device and/or the previous connection instances) can be referred to as a prioritized wireless access point. The network device can be associated with a prioritized wireless access point based on a historical connectivity to wireless access points in the network environment (e.g., previous connections with access points) and a historical derived proximity of the wireless access points in the network environment to the network device (e.g., derived proximities of the wireless network device based on RSSI values). For example, a wireless device can be associated with first wireless access point when the wireless device is stationary (e.g., a wireless printer) and within a close proximity to the first wireless access point. Access points can access a table storing access points associated with a network device, historical connectivity to wireless access points in the network environment, and historical derived proximities of the wireless access points in the network environment.

A connection prioritization action can be performed by wireless access points in the network to connect the first network device with any prioritized wireless access point in the network. For example, the connection prioritization action can include all wireless access points other than the prioritized wireless access point delaying connection to a network device for a threshold time duration (e.g., 300 milliseconds, 1 second, 5 seconds). In this example, the network device can first connect to the prioritized wireless access point during a time duration prior to the network device being able to connect to the other access points. As another example, the connection prioritization action can include the network device connecting to any wireless access points other than the prioritized wireless access point and subsequently disconnecting from the network device when the prioritized access point is available for connection to the network device.

In some embodiments, the network device can include a user device (e.g., a mobile phone, tablet) that can be mobile in nature (e.g., the device may be frequently moved about the network environment). In these embodiments, the network device may not be associated with any access point. Accordingly, the connection action can include identifying a proximity of the network device to all access points in the network environment and connecting to an access point with a nearest proximity to the network device.

The present embodiments can utilize identified wireless client location patterns from Received Signal Strength Indicator (RSSI) values to optimize a multiple Access Point (AP) wireless deployment by building affinity values for specific network devices into the APs based on network device characteristics. In a multi-AP wireless deployment where the APs are capable of coordinating actions or a status of each AP (e.g., either directly between APs or via a controller, server, or the like), a moving average of RSSI values may be calculated for each network device to associate with each given AP. Over time, based either on a simple moving average or a machine learning (ML) model, the frequency of associations for each network device to any other AP weighted according to a set of weights for each AP. This weight can be used to infer whether each unique network device, represented by its media access control (MAC) address is either a mobile device (e.g., a mobile phone), or a static wireless device (e.g., a desktop computer), as well as its propensity for remaining in a given location. The assigned weights can be used to derive a receptivity of any given AP to each network device, where the receptivity can include the availability of the AP to accept an association request against it from the given network device.

For example, an office environment can include 4 APs equally distributed across multiple floors in a building. Network devices can include guest mobile phones, employee mobile phones, laptop computers, desktop computers, printers, etc. As devices connect to APs, network devices can be observed as connecting to APs over time. Some network devices (e.g., mobile phones) can connect to a number of APs over time based on movement of the devices throughout the environment. Other devices (e.g., a printer, desktop computer) can be observed as remaining in a fixed location and can be associated with an access point nearest to such devices.

Historical connection data and historical proximity data can be used to build a receptivity weight for each AP and network device pair, such that a preferred (e.g., nearest) AP can always accept an association request immediately from a corresponding network device, where other APs can perform an action (e.g., delay connection) to the network device to encourage the network devices to associate to prioritized APs that included an optimized RSSI value, which can optimize WiFi performance.

In many instances, systems can use signal strength information to derive a location of a network device to an AP. However, in such instances, APs may be unable to prevent network devices from associating with a sub-optimal AP (e.g., an AP a great distance from the network device), as a stronger AP may not be immediately identified.

The present embodiments can allow for cooperative ranked-choice association affinity between a group of APs within a multi-AP deployment such that network devices can be explicitly directed into associating (or re-associating) with a prioritized AP. Further, the present embodiments can allow for adaptive and dynamic optimization of wireless network devices in a distributed wireless deployment.

A. Network Environment Overview

FIG. 1 illustrates an example network environment 100 including multiple access points (e.g., 102*a-d*) and multiple network devices (e.g., 104*a-c*, 106*a-b*). As noted above, a plurality of access points 102*a-d* can be disposed within the network environment (e.g., a building, an office environment).

The access points 102*a-d* can provide wireless access to external networks (e.g., the internet) across the network environment 100. For example, device 104*a* can establish a connection to access point 102*a*. The access points 102*a-d* can be disposed across the network environment 100 to provide optimized performance (e.g., data throughput) across the network environment 100.

The network environment 100 can include a plurality of network devices 104*a-c*, 106*a-b*. For instance, network devices can include both network devices 104*a-c* that are static in nature (e.g., a server, a desktop computer, a copier) and network devices 106*a-b* that are mobile in nature (e.g., a mobile phone, a tablet, a laptop computer). As described in greater detail below, devices that are static in nature (e.g., 104*a-c*) may establish a prioritized access point, while devices that are mobile in nature (e.g., 106*a-b*) may not include an established prioritized access point.

As shown in FIG. 1, network devices 104*a-c*, 106*a-b* can connect to access points 102*a-d* based on associations between the network devices and access points. For instance, network device 104*a* can correspond with prioritized access point 102*a*. In this example, access point 102*a* can first establish a connection with network device 104*a* while other access points 102*b-d* delay attempting to connect to network device 104*a* according to a connection prioritization action. As another example, network device 104*c* can correspond with prioritized access point 102*c*. In this example, access point 102*c* can first establish a connection with network device 104*c* while other access points 102*a-b*, 102*d* delay attempting to connect to network device 104*c* according to a connection prioritization action.

As another example, network device 106*a* may not correspond with any prioritized access point. In this example, an access point (e.g., 102*a*) can obtain RSSI values of network device 106*a* for each access point 102*a-d*. The access point can derive a proximity of each network device 106*a* to each access point 102*a-d* and select an access point with a nearest proximity to the network device 106*a* (e.g., 102*a*) as the prioritized access point. In this example, the connection prioritization action can include the access point 102*a* first attempting to connect to network device 106*a*.

Figure 2:
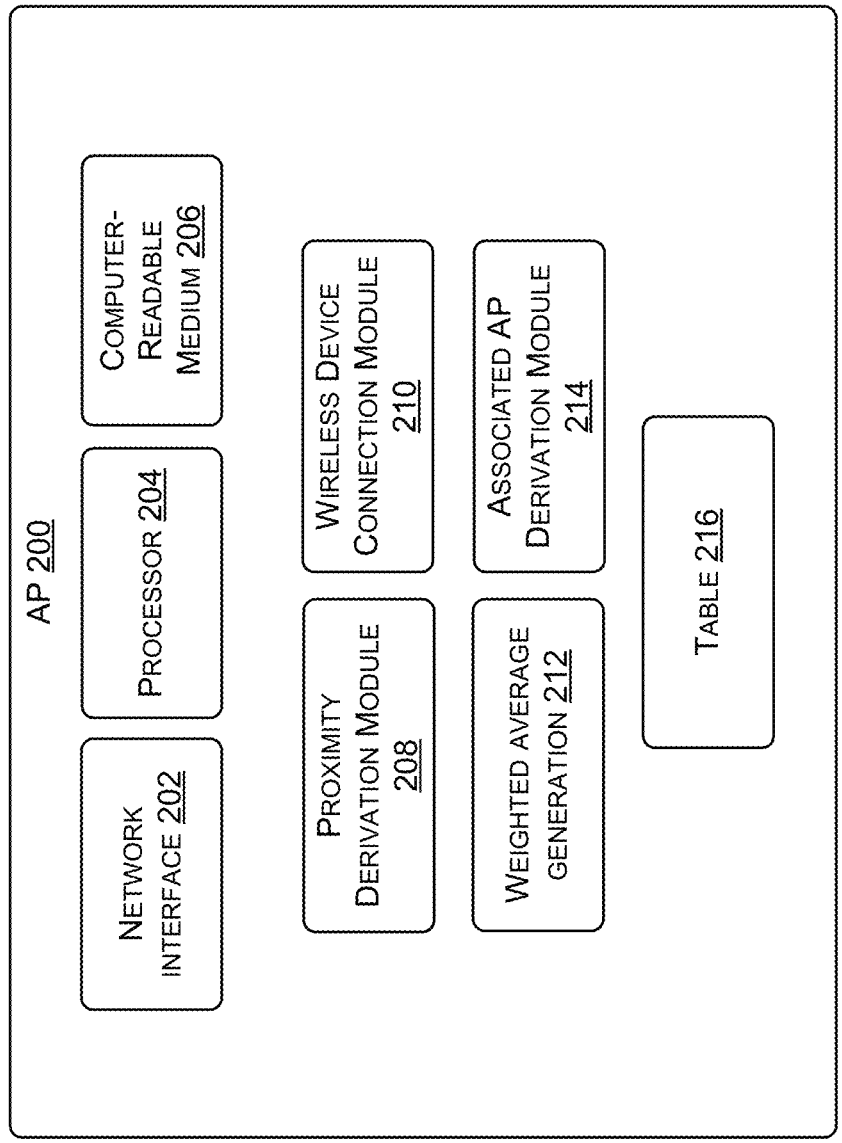
FIG. 2 is a block diagram of an example access point (AP), according to at least one embodiment.

FIG. 2 is a block diagram of an example access point (AP) 200. AP 200 can include features similar to those described with respect to access points 102*a-d* in FIG. 1. The AP can include a network interface 202 facilitating wireless data communication with other APs or network devices. The AP 200 can also include a processor 204 and a computer-readable medium 206 containing instructions to cause the processor to perform processing tasks as described herein.

The AP 200 can include a proximity derivation module 208. The proximity derivation module 208 can obtain signal strength metrics (e.g., an RSSI value) for one or more network device(s). The signal strength metrics can be used to derive an approximate proximity of a network device to each AP. For instance, a RSSI value (e.g., −30 db) for a first network device can be converted into a corresponding proximity (e.g., in meters) to the access point. In some instances, a series of RSSI values can be obtained for each AP. In these instances, a proximity of the network device to each AP can be derived and utilized in selecting an AP as a prioritized AP as described herein.

The AP 200 can also include a wireless device connection module 210. The wireless device connection module 210 can obtain a request to initiate a connection by a network device and initiate a connection to the network device. The wireless device connection module 210 can also obtain identifying information and a signal strength metric for the network device that can be used to determine whether the network device corresponds to a prioritized AP (e.g., as performed in associated AP derivation module 214). The wireless device connection module 210 can perform a connection prioritization action (e.g., provide instructions to APs other than the prioritized AP to delay connection to the network device) to connect the network device to the prioritized AP.

The AP 200 can include a weighted average generation module 212. The weighted average generation module 212 can obtain historical connection and historical proximity data for a network device and assign weights to each AP based on this data. The historical connection and historical proximity data can be obtained/accessed using a table (e.g., 216).

Historical connection data can specify previous connection instances of a network device to an AP. For example, historical connection data can specify ten previous connection instances where a network device (e.g., 104*b*) connects to a first AP (e.g., 102*c*) eight times and a second AP (e.g., 102*b*) two times. The historical connection data can be used to assign a first set of weighted averages to the APs. The first set of weighted averages to each of the APs can be used to assign a network device to a prioritized AP. For example, a first AP (e.g., 102*c*) can be assigned a first weighting factor and a second AP (e.g., 102*b*) can be assigned a second weighting factor. The weighting factors can be provided as integers, values, percentages, etc.

Historical proximity data can specify previous proximity data of a network device with each AP in the network environment. The historical proximity data can indicate a location of the network device relative to the APs in the network environment over time. For example, signal strength metrics (RSSI values) of the network device can be processed to determine that the network device is within a closest proximity to a first AP in the network environment at a given time, which can be included as part of the historical proximity data.

The historical proximity data can be processed to derive a second set of weights for the APs in the network environment. For example, the second set of weights can be assigned to each AP based on an average derived proximity of the network device to each AP over time. For example, a first AP that comprises a closest proximity to the network device of all APs for a majority of a time duration can include a greater weight than a second AP that comprises a more distant proximity to the network device of all APs for a majority of a time duration.

The AP 200 can also include an associated AP derivation module 214. The associated AP derivation module 214 can determine whether a network device is associated with any access point as a prioritized AP. As noted above, a prioritized AP can include an AP with an affinity to a network device (e.g., based on previous connections to the AP and/or a historical proximity of the network device to the AP). For example, an access point disposed near (e.g., within ten feet) a network device (e.g., a desktop computer) can comprise a prioritized AP due to the proximity of the network device to the AP and historical connections of the network device to the AP.

As described herein, determining a prioritized AP for a network device can be based at least in part on a historical connection of the network device to APs in the network, historical proximity data of the network device to APs in the network, current signal strength metrics for the network device, and derived weighting factors for the APs in the network. For example, a first set of weighting factors can be assigned to the APs in the network based on historical connections to the network device and a second set of weighting factors can be assigned to the APs in the network based on historical proximity data for the network device.

Determining a prioritized AP for a network device can include ranking APs by each of the first set of weighting factors and the second set of weighting factors. For instance, a first ranked AP can include an AP with a greatest number of previous connection instances to the network device (as specified by the first set of weighting factors) and a closest proximity to the network device (as specified by the second set of weighting factors). As another example, the prioritized AP can include an AP with weighting factors above a threshold level.

Responsive to determining an AP as the prioritized AP, a connection prioritization action can be performed by the APs in the network. For instance, an action can be identified from multiple potential action based on the AP type, network settings, a network device type, etc. For instance, performing the connection prioritizing action can include providing instructions to all APs other than the prioritized AP to delay connection to the network device for a time duration to prioritize connection to the prioritized AP.

In some instances, a network device may not correspond with a prioritized AP. For example, a device new to the network may not have any previous connections to the network and may not correspond with any AP as a prioritized AP. As another example, a mobile device may be mobile in nature and can connect to multiple APs within the network environment and may not correspond with any AP as a prioritized AP. In such instances, an AP can obtain a signal strength metric of the network device for all APs and select an AP with a strongest signal strength metric (e.g., a closest proximity) as the prioritized AP.

The AP 200 can also include a table 216. The table 216 can provide a listing of, for each network device, signal strength metrics, historical proximity data, historical connection data, weighting factors, prioritized APs, etc. The AP 200 can maintain the table 216 or obtain data included in the table 216 from another AP or a controller node external to the network environment. The table 216 is discussed in greater detail in FIG. 3.

Figure 3:
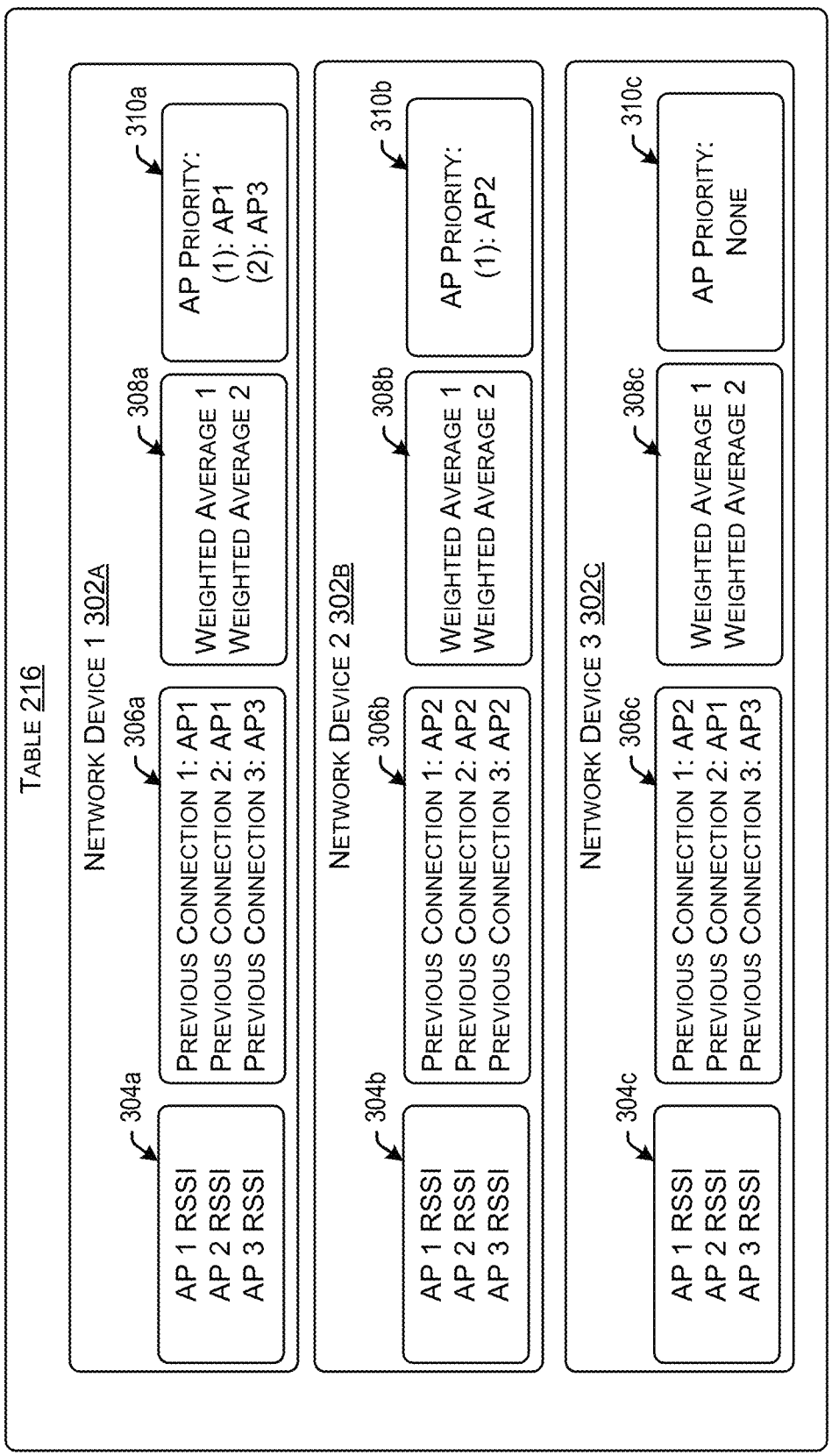
FIG. 3 illustrates an example table, according to at least one embodiment.

FIG. 3 illustrates an example table 216. As noted above, the table 216 can provide data relating to an association between a network device and APs in the network environment. For instance, a table 216 can include data relating to multiple network devices 302*a-c*. For each network device 302*a-c*, the table 216 can include signal strength metric data 304*a-c*, connection history data 306*a-c*, weighted average data 308*a-c*, AP associations 310*a-c*, etc. Each time a network device is connected to an AP in the network, data (e.g., signal strength values, an AP in which the network device connected) can be updated at the table.

The table can maintain a listing of signal strength values 304*a-c* for each AP at a given time instance. The signal strength values can be used to derive a proximity of each network device to each AP in the network. In some instances, some APs may be located beyond a threshold distance from the network device, and the APs may not identify the network device. The signal strength values can be stored over time (e.g., as historical proximity data) to provide a second weighted average for each AP. As an illustrative example, a first network device can have associated RSSI values for APs in the network, where a first AP has a first average RSSI value (−38 db) over a time duration and a second AP has a second average RSSI value (−100 db) over the time duration. In this example, the first AP may have a closer average proximity based on converting the RSSI values into a proximity to the network device. Weighting factors for each AP can be derived and stored in the table 216 (e.g., at 308*a-c*).

The table 216 can also maintain a listing of historical connections (e.g., 306*a-c*) for each network device 302*a-c*. For example, a listing of historical connections can provide that a first AP previously connected to the network device eight times, while a second AP previously connected to the network device one time. A second set of weighted averages can be derived from the historic connections to the network device.

The table data can be utilized to determine whether a network device is associated with an AP. In some embodiments, the table 216 can specify whether an AP is associated with the network device (e.g., in 310*a-c*). As an illustrative example, network device 302*b* can include a desktop computer located in the network environment near access point 2 (AP2). In table 216, the historical proximity data 304*b* can indicate a closest proximity of the network device 302*b* to AP2. Further, as shown in the table 216, the historical connection data 306*b* can specify that the network device 302*b* has previously connected to AP2 in multiple instances. Accordingly, weighted averages (e.g., in 308*b*) can include a greatest weight for AP2 based on the historical connections (e.g., in 306*b*) and historical proximity data (e.g., in 304*b*) to identify AP2 as the prioritized AP (e.g., in 310*b*).

In this example, the table 216 can provide data relating to another network device 302*c* (e.g., a mobile phone). In table 216, the historical proximity data 304*c* may not comprise any AP with a closest proximity over time due to the movement of the mobile phone in the network environment. Further, as shown in the table 216, the historical connection data 306*c* can specify that the network device 302*b* has previously connected to each AP (e.g., AP1, AP2, AP3) in multiple instances. Accordingly, weighted averages (e.g., in 308*b*) may be assigned to all APs such that no AP comprises threshold levels to associate the network device 302*c* with any AP, and no AP is associated with the network device 302*c* (e.g., in 310*c*).

Figure 4:
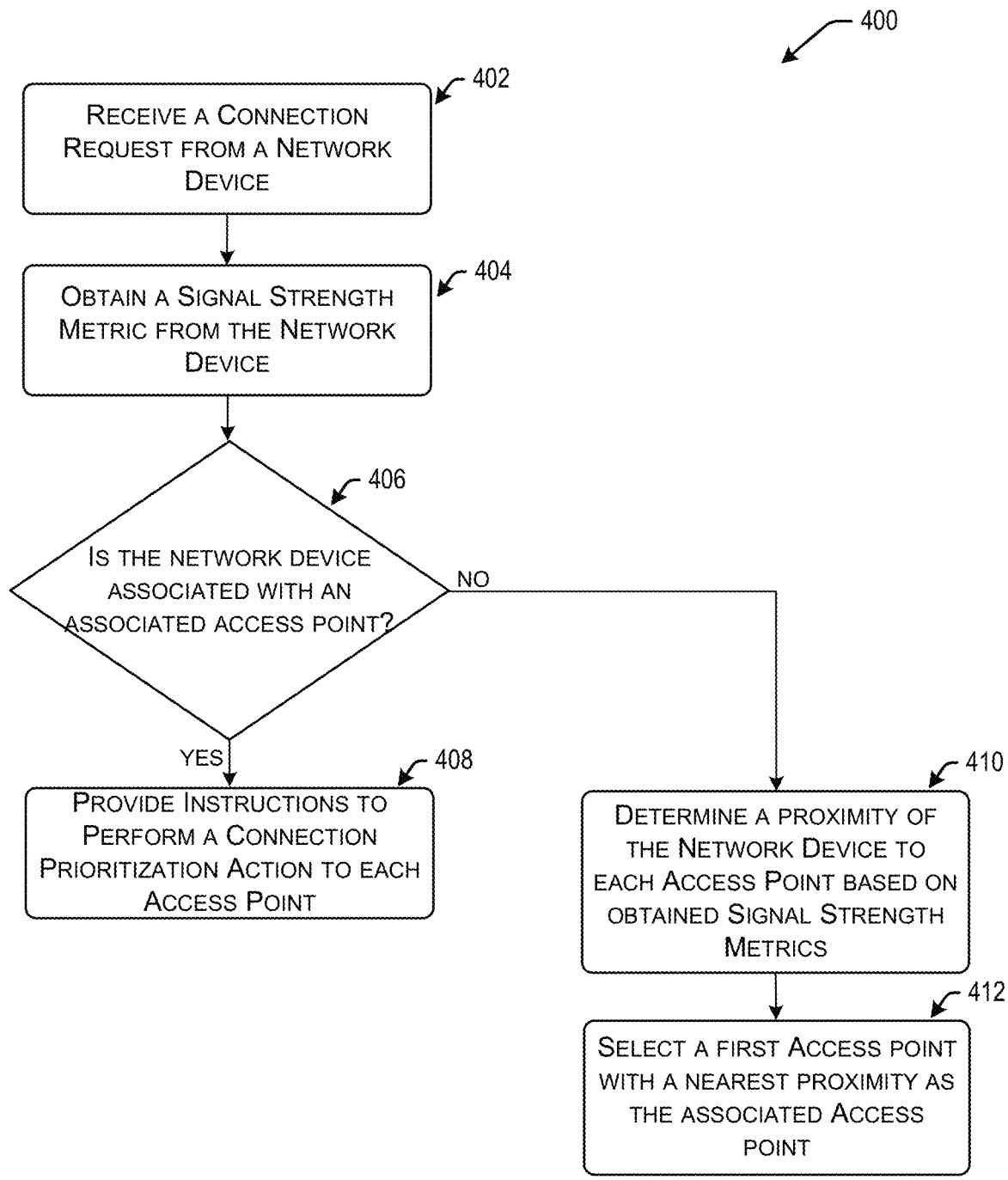
FIG. 4 is a block diagram of an example method for connecting a network device to an AP based on an affinity between the network device and AP, according to at least one embodiment.

B. Example Method for Connecting a Network Device to an AP Based on a Derived Affinity FIG. 4 is a block diagram 400 of an example method for connecting a network device to an AP based on an affinity between the network device and AP. An AP (e.g., 200) as described herein can perform any steps of the method as described herein. In some instances, an external controller node can direct an AP (or a plurality of APs) to perform any steps of the method as described herein.

At 402, a connection request from a network device can be received. For instance, responsive to a network device (e.g., a computer, mobile device) entering the network, the network device can submit a request to connect to the network to any discovered APs in the network. The request can include information identifying the network device (e.g., serial number, MAC address, device type, an account associated with the network device).

At 404, a signal strength metric for the network device can be obtained. This can include the network device (or the AP) obtaining a message and deriving a signal strength metric (e.g., RSSI) from the message. For instance, the network device can interact with each discoverable AP in the network and each AP can derive a respective signal strength metric for each AP. A first AP (a controlling AP) or a controller node can obtain the obtained signal strength metric(s).

At decision 406, it can be determined whether the network device is associated with a prioritized access point. For instance, this can include determining whether the network device has a previously identified prioritized AP (e.g., provided in table 216). As another example, determining whether the network device is associated with a prioritized access point can include deriving weighted averages and identifying an AP as a prioritized AP. Determining whether the network device is associated with a prioritized access point is described in greater detail with respect to FIG. 5 below.

At 408, if the network device corresponds with a prioritized AP, instructions can be provided to each AP in the network to perform a connection action. For instance, all APs other than the prioritized AP can obtain instructions to delay connection to the network device for a time duration, allowing the network device to first connect to the prioritized AP. As another example, all APs other than the prioritized AP can obtain instructions to allow the network device to connect any AP but subsequently disconnect from the AP responsive to determining the prioritized AP is available to connect to the network device. The connection action can prioritize an associated with an affinity to the network device prioritized a connection to the network device.

At 410, responsive to determining that the network device has no prioritized AP, a proximity of the network device to each AP can be determined based on obtained signal strength metrics for each respective AP. For example, signal strength metrics (e.g., RSSI values) can be converted into an estimated proximity to each AP (e.g., using a conversion algorithm, a conversion table). The network device may not be associated with any AP if the network device is new to the network or is a mobile device that connects to multiple APs across the network due to the mobile nature of the device, for example.

At 412, a first AP with a nearest proximity can be selected as the prioritized AP for the network device. For example, RSSI values of APs in a network can specify that a first AP is nearest to a mobile device in the network. In such instances, selecting an AP that is nearest to the network device can optimize data transmission between the network device and the selected AP.

Figure 5:
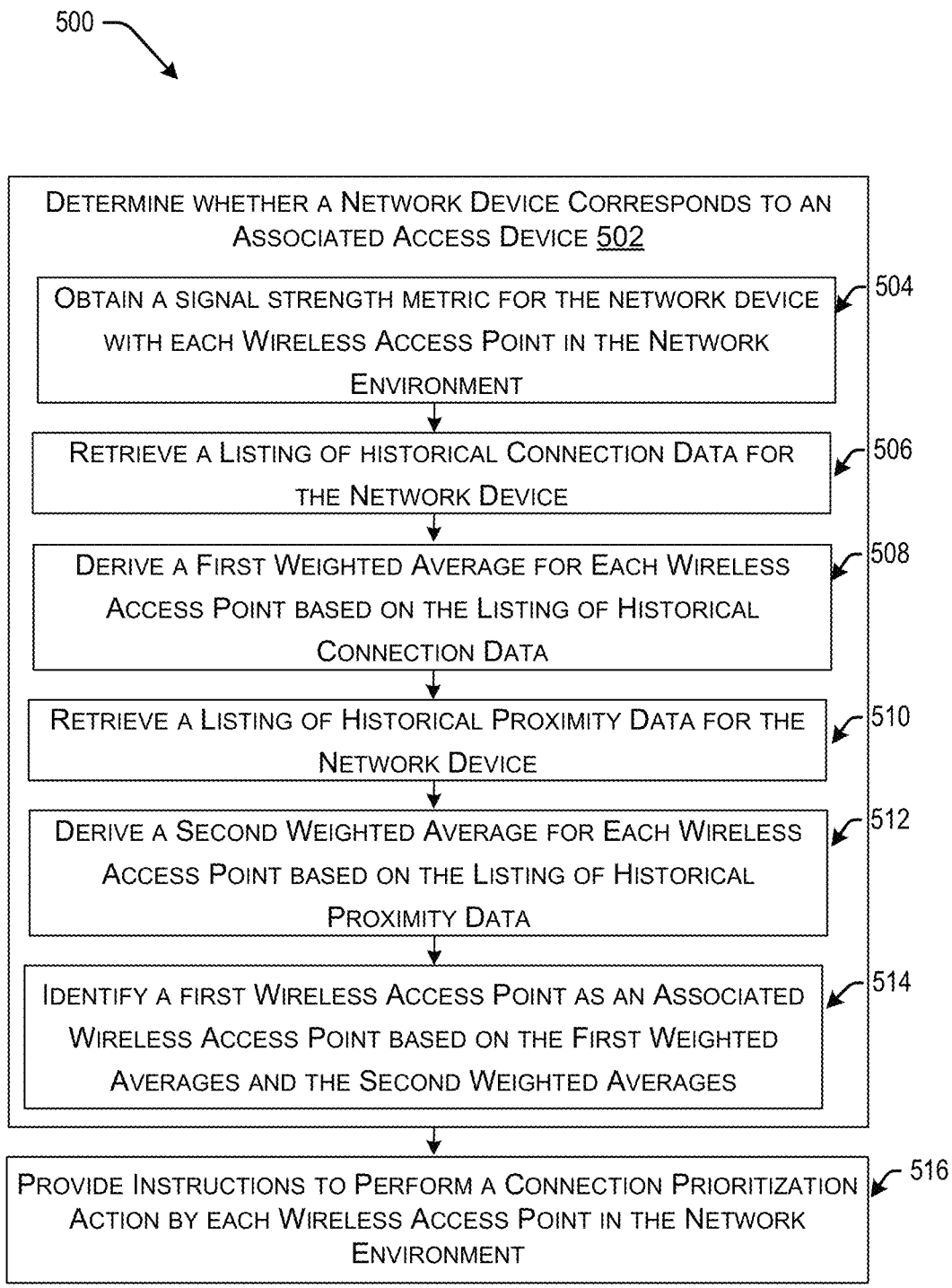
FIG. 5 illustrates a block diagram of an example method for determining whether a network device corresponds to a prioritized AP, according to at least one embodiment.

FIG. 5 illustrates a block diagram 500 of an example method for determining whether a network device corresponds to a prioritized AP (e.g., 502). The method as described in FIG. 5 can be performed by a first wireless access point in the network environment or a controlling node disposed external to the network environment (e.g., disposed in a cloud infrastructure system), for example.

At 504, a signal strength metric for the network device with each AP in the network environment can be obtained. As noted above, signal strength metrics can be indicative of a proximity of each AP to the network device, which can also specify data communication capabilities of each AP for the network device. An AP can obtain signal strength metrics from each respective AP or from the network device. In some embodiments, the AP can only process signal strength data for APs with a signal strength metric above a threshold (e.g., removing any APs outside a threshold distance from the network device). In some embodiments, depending on the network device type, only APs capable of transmitting data over a specific frequency (e.g., 2.4 GHz, 5 GHz) may be processed as described herein, omitting any AP unable to transmit data over the specific frequency.

At 506, a listing of historical connection data for the network device can be retrieved. The historical connection data can specify a number of previous connection instances of the network device to APs in the network. The historical connection data can be retrieved from a table (e.g., 216) either stored at the AP or maintained at another AP (e.g., or an external controller node). For instance, a first AP can identify a network device from identifying information received from the network device and send a request to a controlling node to obtain the historical connection data from the controlling node maintaining the table.

At 508, a first weighted average for each AP can be derived based on the listing of historical connection data. The first weighted average can include assigning weights or weighting values to each AP in the network environment. For example, historical connection data can specify that for ten previous connection instances, a first AP connected to the network device eight times and a second AP connected to the network device two times. The weight assigned to the first AP can include a highest weight given the number of connection instances to the network device, indicating an affinity for the network device to connect to the first AP. Similarly, a second AP can be assigned a second weight that is less than the weight for the first AP. Assigned weights can include values, integers, percentages, multiplication factors, etc., associated with each AP. The assigned weights in the first set of weighting factors can be updated and added to the table.

At 510, a listing of historical proximity data for the network device can be retrieved. The historical proximity data can include signal strength metrics (e.g., RSSI values) for the APs over a time duration. The historical proximity data can be indicative of an average proximity of each AP to the network device over time, and whether the network device is mobile or stationary in nature. The historical proximity data may be retrieved from the table (e.g., stored at the AP or retrieved from an external device).

At 512, a second weighted average for each AP can be derived based on the listing of historical proximity data. The weights can be assigned to each AP based on a derived proximity of each AP to the network device. For example, an average proximity of a first AP to the network device for a time duration (e.g., one week) can include ten feet, and an average proximity of a second AP to the network device for the time duration can include fifty feet. In this example, a first assigned weight for the first AP can be greater than an assigned weight for the second AP based on the average proximity of each AP to the network device. The assigned weights based on the historical proximity data can be indicative of a closer average proximity of each AP to the network device, which can be indicative of an affinity of any AP to the network device.

At 514, a first AP can be identified as the prioritized AP based on the first weighted averages and second weighted averages. For instance, for each AP, the assigned weights from the first weighted averages and second weighted averages can be combined to rank/arrange the APs by the assigned weights. For instance, a first AP with a highest combined assigned weight (e.g., indicative of a number of connection instances to the network device and an average proximity to the network device) can be selected as the prioritized AP. In some instances, an AP can be selected as a prioritized AP only if both assigned weights exceed a threshold level.

At 516, an instruction to perform the connection prioritization action can be provided to each AP in the network. As described above, the connection prioritization action can include instruction to all APs other than the prioritized AP to delay connection to the network device or disconnect from the network device.

C. IaaS Overview

As noted above, infrastructure as a service (IaaS) is one particular type of cloud computing. IaaS can be configured to provide virtualized computing resources over a public network (e.g., the Internet). For example, the external controller or the sharing of data (e.g., tables) between wireless access points as described herein can be operated using one or more IaaS models. In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may first need (or, alternatively, be desired/expected) to be set up. In some instances, the provisioning can be done manually, a provisioning tool may be utilized to provision the resources, and/or deployment tools may be utilized to deploy the code once the infrastructure is provisioned.

Figure 6:
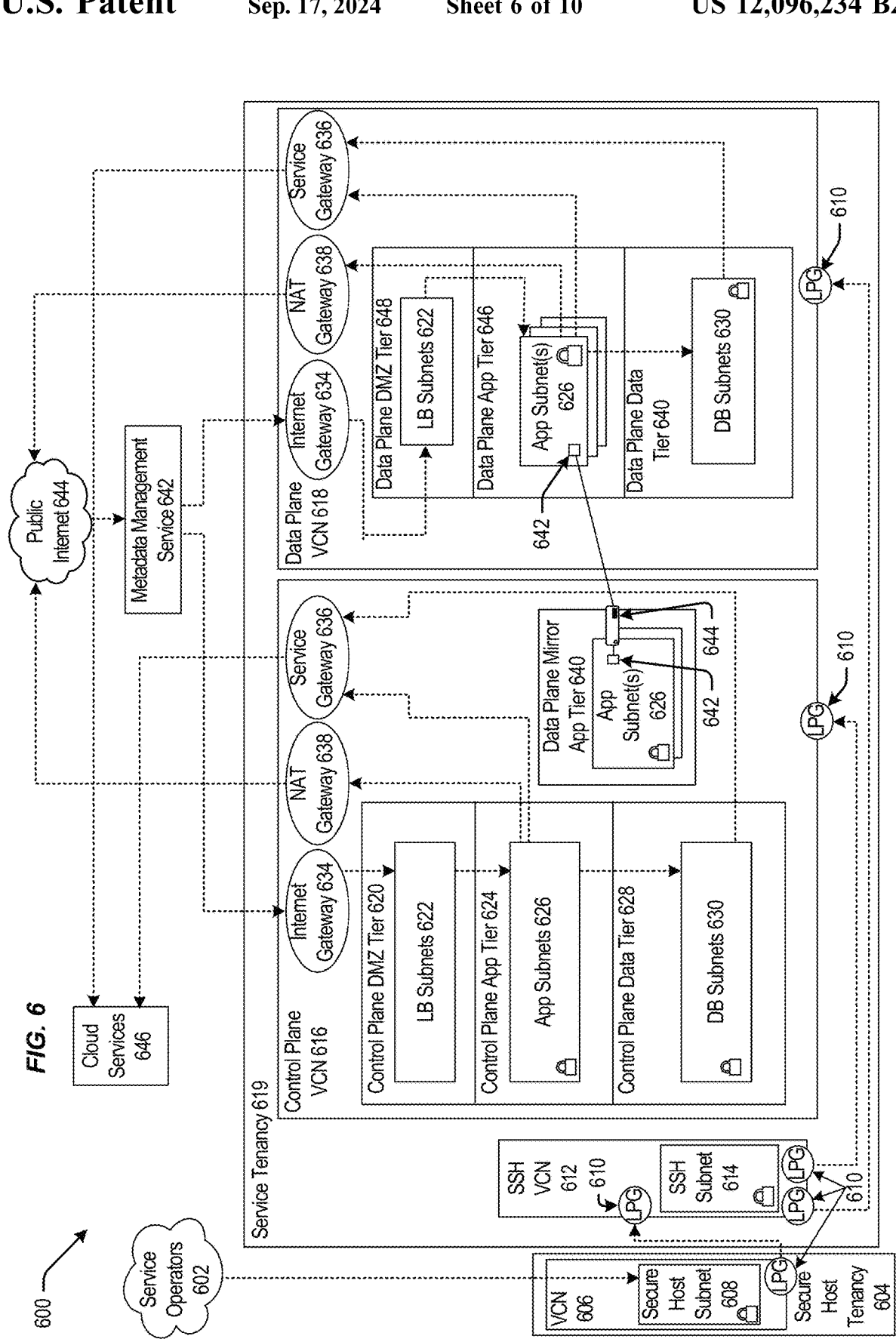
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
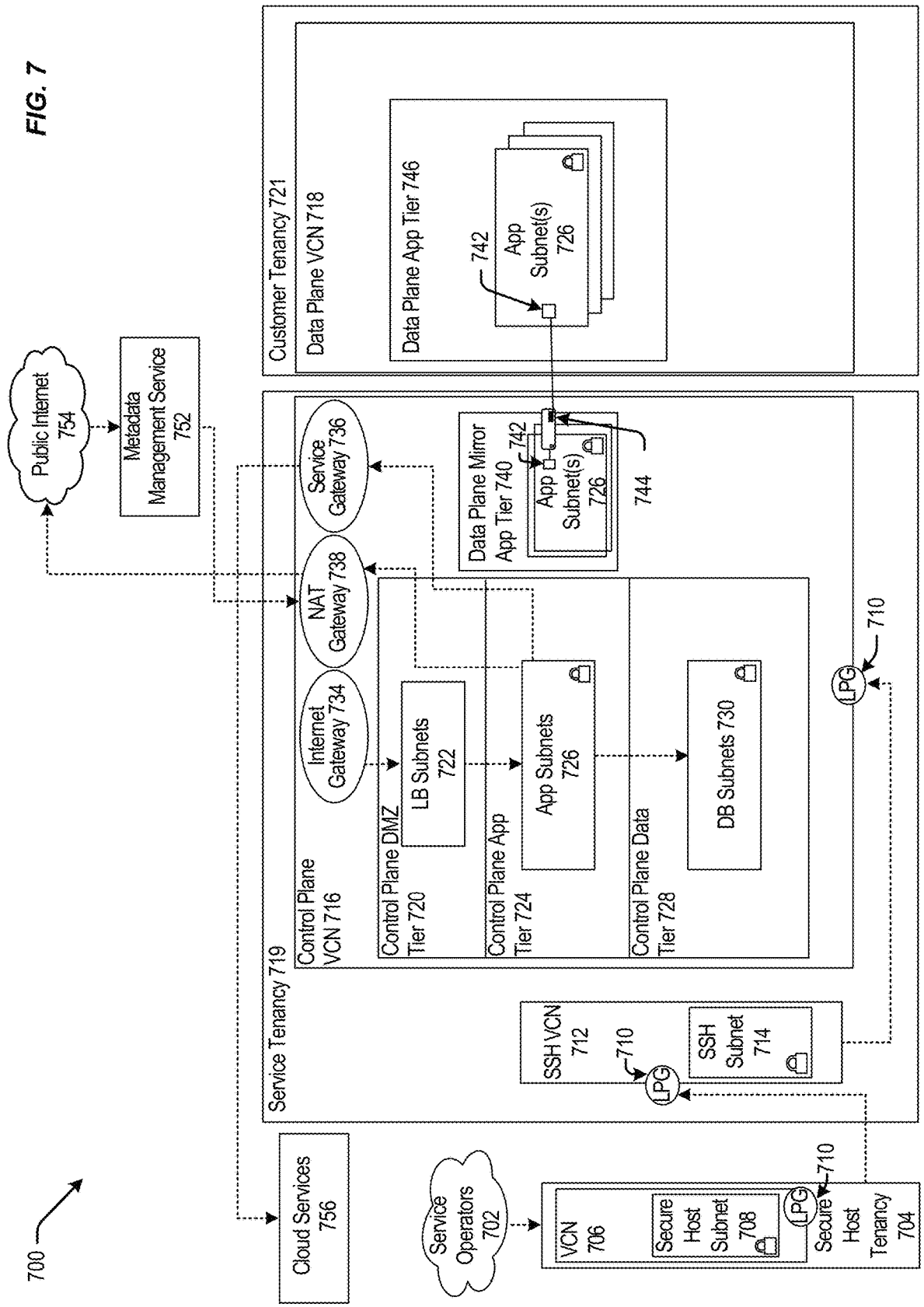
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
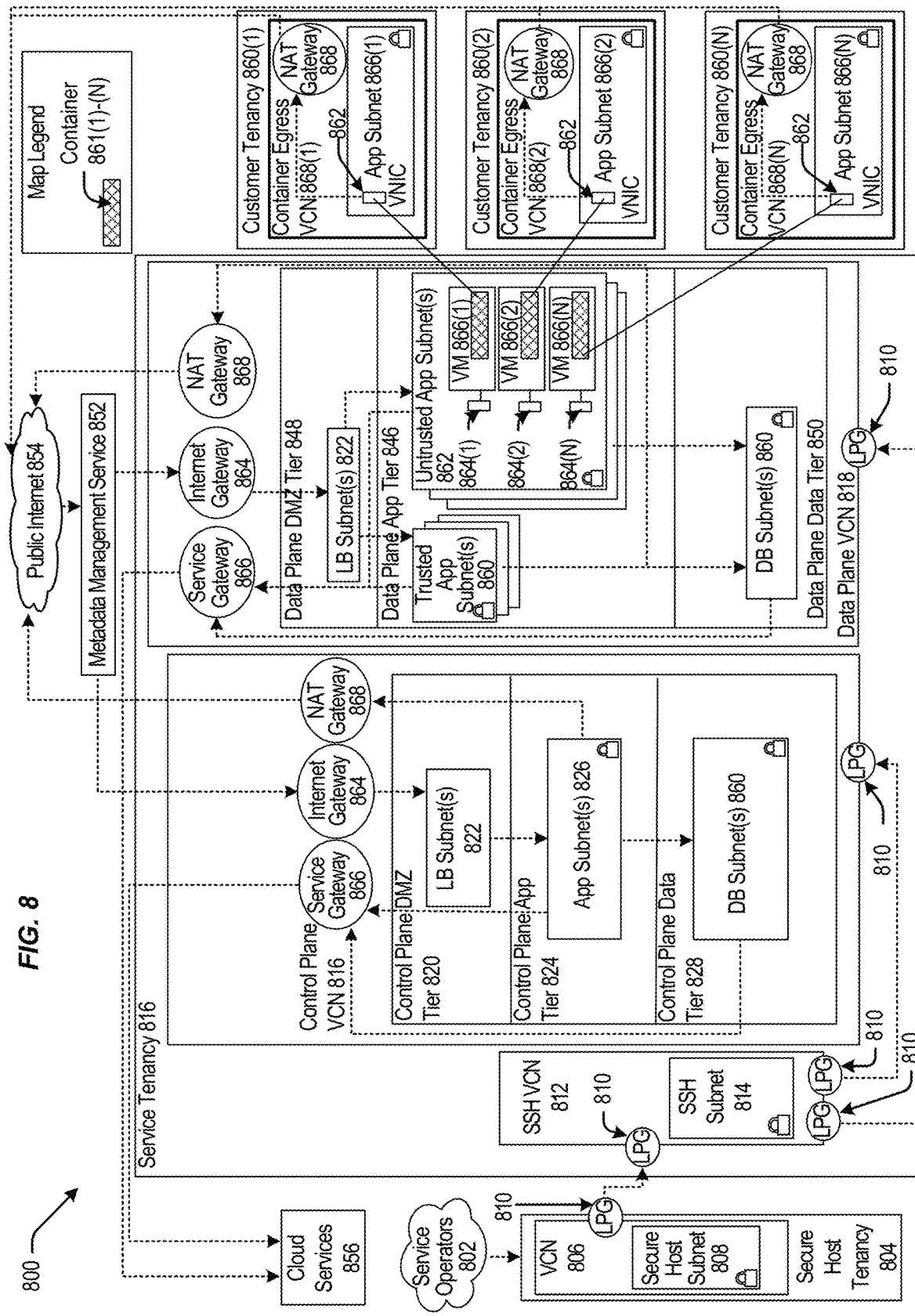
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
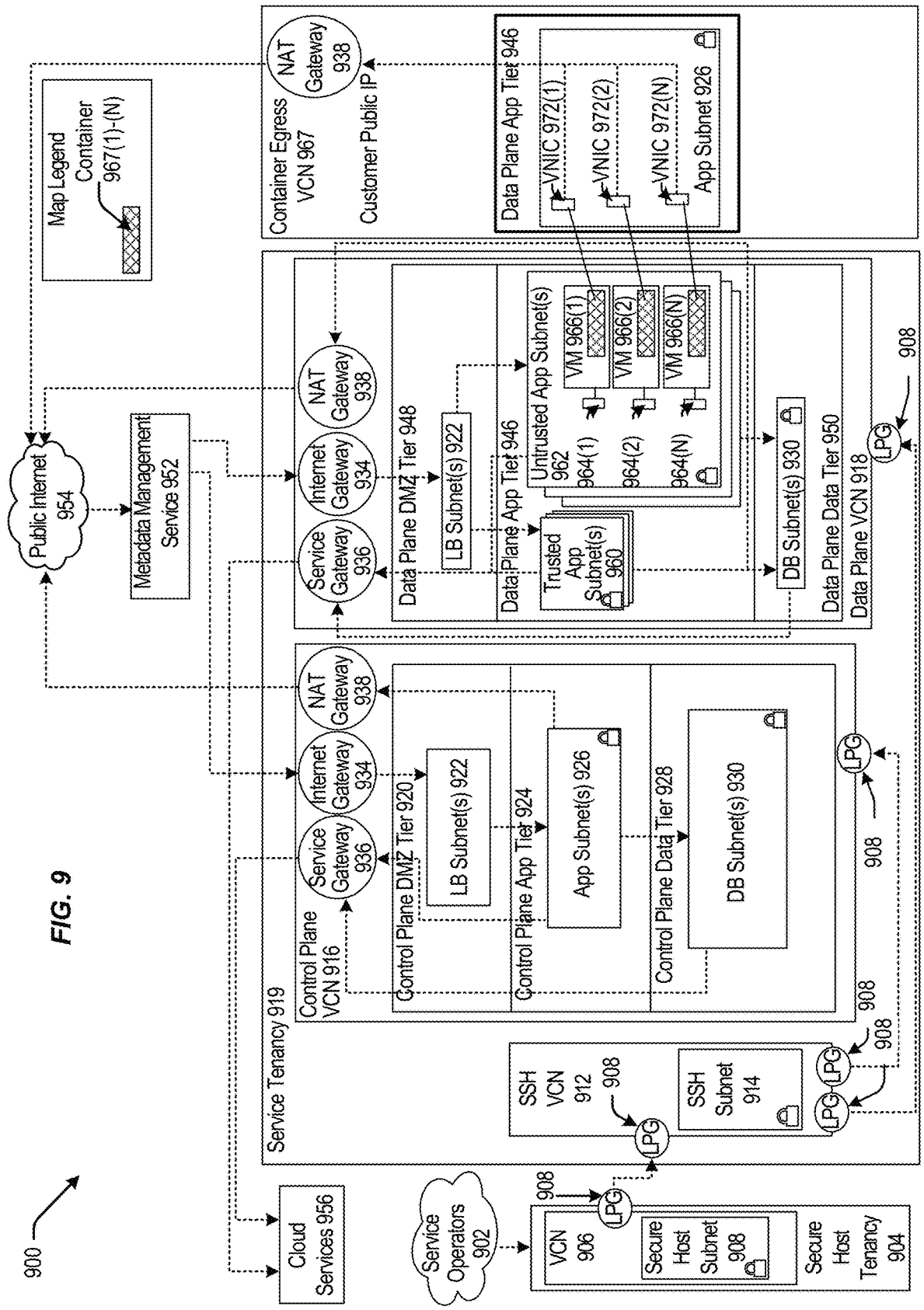
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
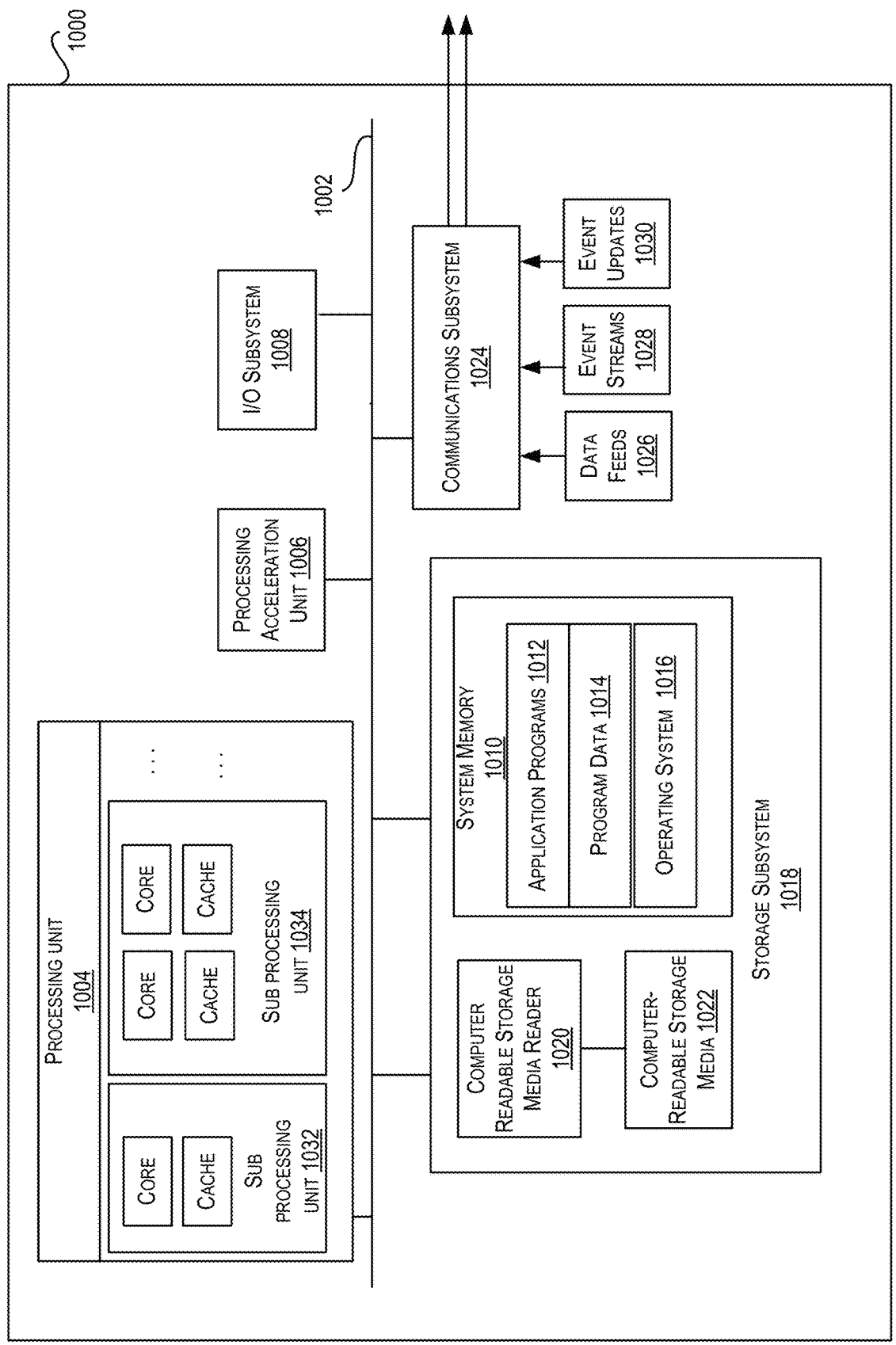
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

The invention claimed is:

1. A method, comprising:
 receiving, by a first wireless access point of a plurality of wireless access points of a network environment, a connection request from a network device;

selecting a second wireless access point of the plurality of wireless access points as a prioritized wireless access point for the network device based at least in part on at least one of:
  a first weighting value corresponding to the second wireless access point, wherein the first weighting value is based on historical proximity data indicative of a historical proximity of the network device to the second wireless access point; or
  a second weighting value corresponding to the second wireless access point, wherein the second weighting value is based on historical connectivity data indicative of one or more previous connections between the network device and the second wireless access point; and
responsive at least in part to selecting the second wireless access point as the prioritized wireless access point for the network device:
  transmitting an instruction to a third wireless access point of the plurality of wireless access points to delay an attempt to establish a connection between the third wireless access point and the network device.

2. The method of claim 1, further comprising:
determining, by the first wireless access point, a signal strength metric based at least in part on a received signal strength indicator (RSSI) value corresponding to the network device;
deriving a geographic proximity between the first wireless access point and the first network device based at least in part on the RSSI value;
determining, based at least in part on the geographic proximity between the first wireless access point and the network device, that a geographic proximity between the network device and the second wireless access point satisfies threshold proximity;
selecting the second wireless access point as the prioritized wireless access point for the network device based further in part on determining that the geographic proximity between the network device and the second wireless access point satisfies the threshold proximity.

3. The method of claim 1, further comprising at least one of:
accessing, by the first wireless access point, a set of historical connectivity data,
determining the historical connectivity data indicative of the historical connectivity of the network device to the second wireless access point based on the set of historical connectivity data, and
computing the second weighting value corresponding to the second wireless access point based on the historical connectivity data indicative of the historical connectivity of the network device to the second wireless access point; or
accessing, by the first wireless access point, a set of historical proximity data,
determining the historical proximity data indicative of the historical proximity of the network device to the second wireless access point based on the set of historical proximity data, and
computing the first weighting value corresponding to the second wireless access point based at least in part on the historical proximity data indicative of the historical proximity of the network device to the second wireless access point.

4. The method of claim 3, further comprising:
subsequent to selecting the second wireless access point as the prioritized wireless access point for the network device:
determining that the network device is connected to the second wireless access point;
responsive to determining that the first network device is connected to the second wireless access point, updating at least one of the first weighting value or the second weighting value based at least in part on data corresponding to the network device being connected to the second wireless access point.

5. The method of claim 1, wherein the third wireless access point receives the instruction to delay the attempt to establish the connection between the third wireless access point and the network device, and responsive to receiving the instruction, the third wireless access point delays the attempt to establish the connection between the third wireless access point and the network device for a threshold time duration.

6. The method of claim 1, further comprising:
subsequent to selecting the second wireless access point as the prioritized wireless access point for the network device:
determining that the network device has established a prioritized connection with the second wireless access point;
determining, based at least in part on data corresponding to the prioritized connection, at least one of:
  a first updated weighting value corresponding to the second wireless access point, wherein the first updated weighting value is based on historical proximity data indicative of a historical proximity of the network device to the second wireless access point, wherein the historical proximity data comprises at least a portion of the data corresponding to the prioritized connection; or
  a second updated weighting value corresponding to the second wireless access point, wherein the second updated weighting value is based on historical connectivity data indicative of one or more previous connections between the network device and the second wireless access point, wherein the historical connectivity data comprises at least a portion of the data corresponding to the prioritized connection; and
selecting, based at least in part on at least one of the first updated weighting value and the second updated weighting value, a fourth wireless access point as the prioritized wireless access point for the network device;
responsive at least in part to selecting the fourth wireless access point as the prioritized wireless access point for the network device,
disconnecting the second wireless access point from the first network device and connecting the network device to the fourth wireless access point as the prioritized wireless access point.

7. The method of claim 1, further comprising:
receiving, by the third wireless access point, the instruction to delay the attempt to establish the connection between the third wireless access point and the network device;
responsive to receiving the instruction, delaying, by the third wireless access point, the attempt to establish the connection between the third wireless access point and the network device for a threshold time duration;
subsequent to delaying the attempt to establish the connection between the third wireless access point and the network device for the threshold time duration:

determining, by the third wireless access point, that a signal strength metric corresponding to the network device satisfies a threshold value; and responsive to determining that the signal strength metric corresponding to the network device satisfies the threshold value, establishing a connection between the third wireless access point and the network device.

8. A system comprising:

at least one device including a hardware processor;

the system being configured to perform operations comprising:

receiving, by a first wireless access point of a plurality of wireless access points of a network environment, a connection request from a network device;

selecting a second wireless access point of the plurality of wireless access points as a prioritized wireless access point for the network device based at least in part on at least one of:

a first weighting value corresponding to the second wireless access point, wherein the first weighting value is based on historical proximity data indicative of a historical proximity of the network device to the second wireless access point; or a second weighting value corresponding to the second wireless access point, wherein the second weighting value is based on historical connectivity data indicative of one or more previous connections between the network device and the second wireless access point;

responsive at least in part to selecting the second wireless access point as the prioritized wireless access point for the network device:

transmitting an instruction to a third wireless access point of the plurality of wireless access points to delay an attempt to establish a connection between the third wireless access point and the network device.

9. The system of claim 8, wherein the operations further comprise:

determining, by the first wireless access point, a signal strength metric based at least in part on a received signal strength indicator (RSSI) value corresponding to the network device;

deriving a geographic proximity between the first wireless access point and the network device based at least in part on the RSSI value;

determining, based at least in part on the geographic proximity between the first wireless access point and the network device, that a geographic proximity between the network device and the second wireless access point satisfies a threshold proximity;

selecting the second wireless access point as the prioritized wireless access point for the network device based further in part on determining that the geographic proximity between the network device and the second wireless access point satisfies the threshold proximity.

10. The system of claim 8, wherein the operations further comprise at least one of:

accessing, by the first wireless access point, a set of historical connectivity data, determining the historical connectivity data indicative of the historical connectivity of the network device to the second wireless access point based on the set of historical connectivity data, and computing the second weighting value corresponding to the second wireless access point based on the historical connectivity data indicative of the historical connectivity of the network device to the second wireless access point; or accessing, by the first wireless access point, a set of historical proximity data, determining the historical proximity data indicative of the historical proximity of the network device to the second wireless access point based on the set of historical proximity data, and computing the first weighting value corresponding to the second wireless access point based at least in part on the historical proximity data indicative of the historical proximity of the network device to the second wireless access point.

11. The system of claim 10, wherein the operations further comprise:

subsequent to selecting the second wireless access point as the prioritized wireless access point for the network device:

determining that the network device is connected to the second wireless access point;

responsive to determining that the network device is connected to the second wireless access point, updating at least one of the first weighting value or the second weighting value based at least in part on data corresponding to the network device being connected to the second wireless access point.

12. The system of claim 8, wherein the third wireless access point receives the instruction to delay the attempt to establish the connection between the third wireless access point and the network device, and responsive to receiving the instruction, the third wireless access point delays the attempt to establish the connection between the third wireless access point and the network device for a threshold time duration.

13. The system of claim 8, wherein the operations further comprise:

subsequent to selecting the second wireless access point as the prioritized wireless access point for the network device:

determining that the network device has established a prioritized connection with the second wireless access point;

determining, based at least in part on data corresponding to the prioritized connection, at least one of:

a first updated weighting value corresponding to the second wireless access point, wherein the first updated weighting value is based on historical proximity data indicative of a historical proximity of the network device to the second wireless access point, wherein the historical proximity data comprises at least a portion of the data corresponding to the prioritized connection; or a second updated weighting value corresponding to the second wireless access point, wherein the second updated weighting value is based on historical connectivity data indicative of one or more previous connections between the network device and the second wireless access point, wherein the historical connectivity data comprises at least a portion of the data corresponding to the prioritized connection; and selecting, based at least in part on at least one of the first updated weighting value and the second updated weighting value, a fourth wireless access point as the prioritized wireless access point for the network device;

responsive at least in part to selecting the fourth wireless access point as the prioritized wireless access point for the network device, disconnecting the second wireless access point from the network device and connecting the network device to the fourth wireless access point as the prioritized wireless access point.

14. The system of claim 8, wherein the operations further comprise:
receiving, by the third wireless access point, the instruction to delay the attempt to establish the connection between the third wireless access point and the network device;
responsive to receiving the instruction, delaying, by the third wireless access point, the attempt to establish the connection between the third wireless access point and the network device for a threshold time duration;
subsequent to delaying the attempt to establish the connection between the third wireless access point and the network device for the threshold time duration determining, by the third wireless access point, that a signal strength metric corresponding to the network device satisfies a threshold value; and
responsive to determining that the signal strength metric corresponding to the network device satisfies the threshold value, establishing a connection between the third wireless access point and the network device.

15. One or more non-transitory computer-readable media comprising instructions that, when executed by one or more hardware processors, cause performance of operations comprising:
receiving, by a first wireless access point of a plurality of wireless access points of a network environment, a connection request from a network device;
selecting a second wireless access point of the plurality of wireless access points as a prioritized wireless access point for the network device based at least in part on at least one of:
a first weighting value corresponding to the second wireless access point, wherein the first weighting value is based on historical proximity data indicative of a historical proximity of the network device to the second wireless access point; or
a second weighting value corresponding to the second wireless access point, wherein the second weighting value is based on historical connectivity data indicative of one or more previous connections between the network device and the second wireless access point; and
responsive at least in part to selecting the second wireless access point as the prioritized wireless access point for the network device:
transmitting an instruction to a third wireless access point of the plurality of wireless access points to delay an attempt to establish a connection between the third wireless access point and the network device.

16. The one or more non-transitory computer-readable media of claim 15, wherein the operations further comprise:
determining, by the first wireless access point, a signal strength metric based at least in part on a received signal strength indicator (RSSI) value corresponding to the network device;
deriving a geographic proximity between the first wireless access point and the network device based at least in part on the RSSI value;
determining, based at least in part on the geographic proximity between the first wireless access point and the network device, that a geographic proximity between the network device and the second wireless access point satisfies a threshold proximity;
selecting the second wireless access point as the prioritized wireless access point for the network device based further in part on determining that the geographic proximity between the network device and the second wireless access point satisfies the threshold proximity.

17. The one or more non-transitory computer-readable media of claim 15, wherein the operations further comprise at least one of:
accessing, by the first wireless access point, a set of historical connectivity data,
determining the historical connectivity data indicative of the historical connectivity of the network device to the second wireless access point based on the set of historical connectivity data, and
computing the second weighting value corresponding to the second wireless access point based on the historical connectivity data indicative of the historical connectivity of the network device to the second wireless access point; or
accessing, by the first wireless access point, a set of historical proximity data,
determining the historical proximity data indicative of the historical proximity of the network device to the second wireless access point based on the set of historical proximity data, and
computing the first weighting value corresponding to the second wireless access point based at least in part on the historical proximity data indicative of the historical proximity of the network device to the second wireless access point.

18. The one or more non-transitory computer-readable media of claim 15, wherein the operations further comprise:
receiving, by the third wireless access point, the instruction to delay the attempt to establish the connection between the third wireless access point and the network device;
responsive to receiving the instruction, delaying, by the third wireless access point, the attempt to establish the connection between the third wireless access point and the network device for a threshold time duration;
subsequent to delaying the attempt to establish the connection between the third wireless access point and the network device for the threshold time duration:
determining, by the third wireless access point, that a signal strength metric corresponding to the network device satisfies a threshold value; and
responsive to determining that the signal strength metric corresponding to the network device satisfies the threshold value, establishing a connection between the third wireless access point and the network device.

19. The one or more non-transitory computer-readable media of claim 15, wherein the second wireless access point is selected at least in part by the first wireless access point as the prioritized wireless access point for the network device, and wherein the instruction to the third wireless access point to delay the attempt to establish the connection between the third wireless access point and the network device is transmitted at least in part by the first wireless access point.

20. The one or more non-transitory computer-readable media of claim 15, wherein in response to the instruction to delay the attempt to establish the connection between the third wireless access point and the network device, the third wireless access point denies at least one attempt by the network device to connect to the third wireless access point during a time duration corresponding to the delay.

21. The one or more non-transitory computer-readable media of claim 20, wherein, during the time duration corresponding to the delay, the network device connects to the second wireless access point, wherein the network device connecting to the second wireless access point during the time duration corresponding to the delay is attributable at least in part to the third wireless access point denying the at least one attempt by the network device to connect to the third wireless access point during the time duration corresponding to the delay.

22. The one or more non-transitory computer-readable media of claim 20, wherein the connection between the third wireless access point and the network device is established subsequent to the time duration corresponding to the delay.

23. The one or more non-transitory computer-readable media of claim 20,
wherein the instruction to delay the attempt to establish the connection between the third wireless access point and the network device comprises instructions that (a) allow the third wireless access point to establish the connection between the third wireless access point and the network device if the second wireless access point is unavailable to connect to the network device, and (b) cause the third wireless access point to terminate the connection upon determining that the second wireless access point is available to connect to the network device;
wherein the third wireless access point determines that the second wireless access point is unavailable to connect to the network device, and in response to determining that the second wireless access point is unavailable to connect to the network device, the third wireless access point to establish the connection between the third wireless access point and the network device;
wherein subsequent to establishing the connection between the third wireless access point and the network device, the third wireless access point determines that the second wireless access point is available to connect to the network device, and in response to determining that the second wireless access point is available to connect to the network device, the third wireless access point terminates the connection between the third wireless access point and the network device.

24. A method comprising:
receiving, by a first wireless access point of a plurality of wireless access points of a network environment, a connection request from a network device;
accessing, by the first wireless access point, a dataset comprising data pertaining to one or more previous connections between the network device and a second wireless access point of the plurality of wireless access points;
selecting, by the first wireless access point, the second wireless access point as a prioritized wireless access point for the network device based at least in part on the dataset;
responsive at least in part to selecting the second wireless access point as the prioritized wireless access point for the network device:
transmitting, by the first wireless access point, an instruction to a third wireless access point of the plurality of wireless access points to delay an attempt to establish a connection between the third wireless access point and the network device.

25. The method of claim 24, further comprising:
determining, by the first wireless access point, a signal strength metric based at least in part on a received signal strength indicator (RSSI) value corresponding to the network device;
deriving a geographic proximity between the first wireless access point and the first network device based at least in part on the RSSI value;
determining, based at least in part on the geographic proximity between the first wireless access point and the network device, that a geographic proximity between the network device and the second wireless access point satisfies a threshold proximity;
selecting the second wireless access point as the prioritized wireless access point for the network device based further in part on determining that the geographic proximity between the network device and the second wireless access point satisfies the threshold proximity.

26. The method of claim 24, further comprising:
subsequent to selecting the second wireless access point as the prioritized wireless access point for the network device:
determining that the network device has established a prioritized connection with the second wireless access point;
selecting, based at least in part on data corresponding to the prioritized connection, a fourth wireless access point as the prioritized wireless access point for the network device;
responsive at least in part to selecting the second wireless access point as the prioritized wireless access point for the network device:
disconnecting the second wireless access point from the network device, and
connecting the network device to the fourth wireless access point as the prioritized wireless access point.

* * * * *

UNITED STATES PATENT AND TRADEMARK OFFICE
CERTIFICATE OF CORRECTION

PATENT NO. : 12,096,234 B2
APPLICATION NO. : 17/350222
DATED : September 17, 2024
INVENTOR(S) : Phillippe Page 1 of 1

It is certified that error appears in the above-identified patent and that said Letters Patent is hereby corrected as shown below:

In the Claims

In Column 27, Line 31, in Claim 2, after "the" delete "first".

In Column 27, Line 38, in Claim 2, delete "threshold" and insert -- threshold a --, therefor.

In Column 28, Line 7, in Claim 4, after "the" delete "first".

In Column 28, Line 53, in Claim 6, after "the" delete "first".

In Column 31, Line 18, in Claim 14, delete "duration" and insert -- duration: --, therefor.

In Column 34, Line 21, in Claim 25, after "the" delete "first".

Signed and Sealed this
Twenty-eighth Day of January, 2025

Coke Morgan Stewart
*Acting Director of the United States Patent and Trademark Office*